United States Patent [19]

Brecker et al.

[11] Patent Number: 4,500,665

[45] Date of Patent: Feb. 19, 1985

[54] CODISPERSED PARTICULATE LUBRICANT STABILIZER COMPOSITIONS FOR SYNTHETIC RESINS

[75] Inventors: Lawrence R. Brecker, Brooklyn; Charles Keeley, Wantagh, both of N.Y.

[73] Assignee: Argus Chemical Corporation, Brooklyn, N.Y.

[21] Appl. No.: 507,851

[22] Filed: Jun. 27, 1983

[51] Int. Cl.³ ............................................. C08K 5/20
[52] U.S. Cl. ................................ 524/227; 252/47.5; 524/394; 524/487; 524/567
[58] Field of Search ............... 524/227, 567, 487, 394; 252/47.5

[56] References Cited

U.S. PATENT DOCUMENTS

| | | | |
|---|---|---|---|
| 3,090,768 | 5/1963 | Ray et al. | 524/227 |
| 3,340,219 | 9/1967 | Stemmler | 524/227 |
| 4,345,046 | 8/1982 | Ejk et al. | 524/394 |

Primary Examiner—Joseph L. Schofer
Assistant Examiner—J. M. Reddick

[57] ABSTRACT

Codispersed particulate lubricant stabilizer compositions for synthetic resins are provided, the particles consisting essentially of from about 4 parts to about 1 part polyvalent fatty acid soap homogeneously codispersed with from 1 part to about 4 parts alkylene bis(-fatty acid amide); as well as synthetic resin compositions containing the same.

16 Claims, No Drawings

CODISPERSED PARTICULATE LUBRICANT STABILIZER COMPOSITIONS FOR SYNTHETIC RESINS

Guenther Illmann, SPE Journal, June 1967, pages 71 to 76 and 121, in discussing the indispensable functions of lubricants in plastics processing, points out that of primary importance in polyvinyl chloride resin processing is the improvement of internal flow characteristics of the resin, as well as a reduction of the tendency for the resin to adhere to the surfaces of the processing equipment, with resulting improvement of the surface smoothness of the finished resin product. Lubricants act on the resin both internally and externally, as determined by the chemical composition of the resin and the lubricant, as well as the amounts.

The length of the carbon chain of the lubricant and its polarity are both important in establishing whether the lubricant will be soluble and to what extent in the resin. Lubricants characterized by long carbon chains such as long chain fatty acid groups are not readily soluble in the resin, and consequently act externally, but to the extent that they are dispersed in the resin, they have an internal lubricating influence as well.

Compatibility of the lubricant with the resin is also influenced by polarity, those lubricants having polar functional groups tending to be more compatible with the resin than those that do not.

The quantity of lubricant present also has an effect, the amount of lubricant added beyond its limit of solubility in the resin serving to promote an external lubricating function. Temperature and pressure also affect lubricant solubility in the resin.

The art has accordingly developed a large group of lubricants characterized by long carbon chains and the presence of polar groups, including fatty acid soaps of polyvalent metals, and alkylene bis(fatty acid amides). These materials are slightly less soluble than esters of fatty acids, fatty alcohols and fatty acids, but because of their polar groups they become dispersed in the resin, and accordingly these lubricants serve as both internal and external lubricants, giving a good balance of lubricant properties. In order to improve this balance, mixtures of these lubricants have been used, permitting adjusting the balance by varying the kinds and amounts of the different lubricants.

In accordance with the present invention, it has been determined that codispersed particulate lubricant stabilizer compositions display a better lubricant balance than physical mixtures of the same lubricants. The codispersed particulate lubricant stabilizer compositions of the invention are composed of particles consisting essentially of from about 4 parts to 1 part polyvalent metal fatty acid soap homogeneously codispersed with from about 1 part to about 4 parts alkylene bis(fatty acid amide). These codispersed compositions give a better lubricant and stabilizing effect than the same amounts of each component, polyvalent metal fatty acid soap and alkylene bis(fatty acid amide), used separately in the same amount. In addition, such codispersed compositions simplify the manufacturing process, since they eliminate the preliminary mixing step previously required when mixtures of lubricants are employed.

An important and preferred embodiment of these compositions also includes a synthetic resin stabilizer codispersed with the polyvalent metal fatty acid soap and alkylene bis(fatty acid amide) in the course of preparation of the particles of these compositions.

The polyvalent metal fatty acid soap is of an organic acid having from about ten to about twenty-four carbon atoms. The polyvalent metal can be any metal of Group II of the Periodic Table, such as zinc, calcium, cadmium, barium, magnesium, strontium, and heavy metals such as lead. The alkali metal salts are unsatisfactory. The acid can be any organic non-nitrogenous monocarboxylic fatty acid having from ten to twenty-four carbon atoms. The aliphatic organic acids are operable as a class. By the term "aliphatic acid" is meant any open chain carboxylic acid, substituted, if desired, with non-reactive groups, such as halogen, sulfur and hydroxyl.

As exemplary of the acids which can be used in the form of their metal salts there can be mentioned the following: capric acid, undecylic acid, lauric acid, myristic acid, palmitic acid, margaric acid, stearic acid, oleic acid, ricinoleic acid, behenic acid, chlorocaproic acid and hydroxy capric acid.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

The alkylene bis(fatty acid amides) are defined by the formula:

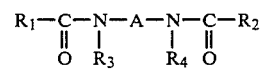

wherein:
   $R_1$ and $R_2$ are long chain saturated or unsaturated fatty acid groups having from about nine to about twenty-three carbon atoms;
   $R_3$ and $R_4$ are hydrogen or lower alkyl having from one to about six carbon atoms; and
   A is an alkylene group having from two to about six carbon atoms, which may be straight chain or branched.

Exemplary $R_1$ and $R_2$ groups include capryl, undecyl, lauryl, myristyl, palmityl, margaryl, stearyl, oleyl, ricinoleyl, behenyl, and eicosyl.

Exemplary $R_3$ and $R_4$ groups include methyl, ethyl, isopropyl, butyl, amyl, isoamyl, hexyl and isohexyl.

Exemplary A groups include ethylene, propylene, methyl ethylene, 1,1- and 1,2-dimethyl ethylene, butylene, 1-, 2- and 3-methyl butylene, pentylene, hexylene, 1,2,3-trimethyl propylene, and 1,2-, and 1,3-dimethyl butylene.

The codispersion of the polyvalent metal fatty acid soap with the alkylene bis(fatty acid amide) is formed in the course of preparation of the polyvalent metal fatty acid soap and alkylene bis(fatty acid amide) from the starting materials, carrying out the preparatory reactions simultaneously or in sequence. It thus becomes possible to manufacture the two components of the codispersion simultaneously or in sequence in the same reaction vessel, which greatly simplifies the manufacturing procedure. Following completion of the codispersion, the mix can be allowed to solidify, and is then subdivided by grinding or flaking. Alternatively, the melt can be sprayed into cool air, and thereby solidified as droplets or spheres.

If it is desired that the codispersion include a synthetic resin stabilizer and/or hydrocarbon wax, the resin stabilizer and/or hydrocarbon wax can be added to the hot melt, before solidification and subdivision. In this way, the stabilizer and/or wax is homogeneously codispersed with the polyvalent metal fatty acid soap and alkylene bis(fatty acid amide).

The terms "codispersed" and "codispersion" as used in the specification and claims mean that the codispersed mixture or codispersion has been formed in the course of preparation of the polyvalent metal fatty acid soap and alkylene bis(fatty acid amide) from the starting materials, carrying out the preparatory reactions simultaneously or in sequence.

The lubricant stabilizer compositions of the invention can be employed in combination with any conventional heat and light stabilizers for the particular synthetic polymer. The synthetic resin stabilizer can be a liquid or a solid, but preferably a liquid, or a solid that is liquid at the blending temperature.

The lubricant stabilizer compositions of the invention are effective lubricants and stabilizers to enhance the resistance to deterioration due to heat of synthetic polymeric materials which are susceptible to such degradation, including polyolefins such as low density polyethylene, high density polyethylene, polypropylene, polybutylene, polyisobutylene, polypentylene, and polyisopentylene; polystyrene; polydienes, such as polybutadiene and polyisoprene; and copolymers of olefins and dienes with other ethylenically and acetylenically unsaturated monomers, such as ethylene-propylene copolymers, ethylene-butene copolymers, ethylene-pentene copolymers, ethylene-vinyl acetate copolymers, styrene-butadiene copolymers, acrylonitrile-butadiene-styrene copolymers, synthetic rubbers of all types, such as polychloroprene; polyvinyl halides, including polyvinyl chloride, polyvinylidene chloride; and copolymers of vinyl chloride and vinylidene chloride; vinyl chloride and vinyl acetate; vinylidene chloride and vinyl acetate; and other ethylenically unsaturated monomers; polyacetals such as polyoxymethylene and polyoxyethylene; polyesters such as polyethylene glycol-terephthalic acid ester polymers; polyamides such as polyepsilon caprolactam; polyhexamethylene adipamide and polydecamethylene adipamide; polycarbonates; polyurethanes; and epoxy resins.

The synthetic polymer can be in any physical form, including (for example) filaments, yarns, films, sheets, molded articles, latex, and foam.

With polyolefin resins there can be employed fatty acid salts of polyvalent metals, organic phosphites, phenolic and thiophenolic antioxidants, and the higher fatty alcohol esters of thiodipropionic acids, such as, for example, dilauryl thiodipropionate.

With polyamide resin compositions, polyamide stabilizers such as copper salts in combination with iodides and/or phosphorus compounds and salts of divalent manganese can be used.

With synthetic rubbers and acrylonitrile-butadiene-styrene terpolymers, antioxidants such as hindered phenols and bis-phenols, polyvalent metal salts of the high fatty acids, and organic phosphites can be used.

Polyvinyl chloride resin stabilizers that can be included in this way include organotin compounds, such as the organotin maleates; organotin laurates; organotin mercaptocarboxylic acid esters; organotin mercaptoalkanol esters of carboxylic acids; organotin mercaptides; organotin maleate half esters of polyhydric and polyhydric alcohols; organotin mercaptocarboxylic acid ester sulfides; and organotin thioalkanol carboxylic acid ester sulfides; organic phosphites; phenolic antioxidants, such as bis-phenols, hindered phenols, hindered bis-phenols; and polyvalent metal phenolates. Ultraviolet light absorbers such as 2,2,6,6-tetramethyl piperidyl compounds also can be incorporated in the hot melts before subdivision.

In addition, other conventional additives for synthetic polymers, such as plasticizers, other lubricants, emulsifiers, antistatic agents, flame-proofing agents, pigments and fillers, can be employed.

The term "polyvinyl chloride" as used herein is inclusive of any polymer formed at least in part of the recurring group:

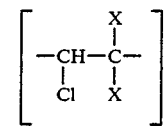

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chloride, such as those disclosed in British Pat. No. 893,288, and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major proportion with other synthetic resins such as chlorinated polyethylene or a copolymer of acrylonitrile, butadiene and styrene. Among the polyvinyl chlorides which can be stabilized are the uniaxially-stretch oriented polyvinyl chlorides described in U.S. Pat. No. 2,934,593 to Isaksem et al, that is, syndiotactic polyvinyl chloride, as well as atactic and isotactic polyvinyl chlorides.

The lubricant stabilizers of this invention, both with and without supplementary polyvinyl chloride resin stabilizers, are excellent stabilizers for both plasticized and rigid polyvinyl chloride resins. When plasticizers are employed, they may be incorporated into the polyvinyl chloride resins in accordance with conventional means. The conventional plasticizers can be used, such as dioctyl phthalate, dioctyl sebacate and tricresyl phosphate. A plasticizer can be used in an amount within the range from 0 to 45 parts by weight of the resin.

Particularly useful plasticizers are the epoxy higher fatty acid esters having from about twenty to about one hundred fifty carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized linseed oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

Impact modifiers, for improving the toughness or impact-resistance of unplasticized resins, can also be added to the resin compositions stabilized by the present invention in minor amounts of usually not more than 10%. Examples of such impact modifiers include chlorinated polyethylene, ABS polymers, and polyacrylate butadiene graft copolymers.

The lubricant stabilizer compositions of the invention can be employed with any of the conventional polyvinyl chloride resin additives, including in addition other lubricants such as paraffin wax, polyethylene wax, stearamide, petrolatum, and natural waxes, as well as plasticizers, emulsifiers, antistatic agents, flame-proofing agents, pigments and fillers.

A sufficient amount of the lubricant stabilizer composition is used to enhance the lubricity as well as the resistance of the synthetic resin to deterioration in physical properties, including, for example, discoloration and embrittlement, under the processing conditions to which the polymer will be subjected in working up and conversion. Very small amounts are usually adequate. Amounts within the range from about 0.01 to about 2% lubricant stabilizer composition by weight of the synthetic resin are satisfactory. Preferably, an amount within the range from about 0.1 to about 1% is employed, for optimum lubricity with stabilizing effectiveness.

Preferably, the lubricant stabilizer composition is added to a polyvinyl chloride resin in an amount to provide in the resin from about 0.05 to about 3% of the polyvalent metal fatty acid soap, and from about 0.05 to about 3% of the alkylene bis-fatty acid amide, as well as from about 0.01 to about 3% polyvinyl chloride resin stabilizer, if present.

For other polymers the amounts are as follows:

| Polymer | % by weight lubricant stabilizer |
|---|---|
| Polyethylene | 0.1 to 1% |
| Polypropylene | 0.1 to 1% |
| Polystyrene | 0.1 to 2% |
| ABS polymer | 0.1 to 3% |
| Acetal polymer | 0.1 to 1% |
| Polycarbonate and glass-reinforced thermoplastics | 0.1 to 2% |

The lubricant stabilizer composition is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the lubricant stabilizer. Mixing is continued until the mixture is substantially uniform. The resulting composition is then removed from the mixing equipment and brought to the size and shape desired for marketing or use.

The polyvinyl chloride resin can be worked into the desired shape, such as by milling, calendering, extrusion or injection molding, or fiber-forming. In such operations, it will be found to have a considerably improved resistance to discoloration and embrittlement on exposure to heat and light.

The lubricant stabilizer compositions of the invention are particularly recommended for use in the extrusion of rigid profiles, such as siding and window frames, where outstanding weatherability is required, and provide excellent lubricity, as well as excellent stability when used with the sulfur-containing organotin stabilizers in common use for this application.

The following Examples in the opinion of the inventors represent preferred embodiments of the codispersions of the invention, and their preparation.

EXAMPLE I

A reaction vessel was charged with 946 parts by weight commercial stearic acid (acid value 204.1, containing about 70% n-octadecanoic acid, with the remainder mostly hexadecanoic acid and small amounts of other fatty acids). The vessel was blanketed with nitrogen, and heat applied to melt the stearic acid. Agitation was started when most of the acid was melted. When the acid reached 70° C., addition of 53 parts ethylene diamine was started through a tube extending below the surface of the acid to avoid volatilization of the amine. The addition of the amine was exothermic, and was regulated to keep the mixture in the range 70°–95° C. After the ethylenediamine had been added, the mixture was gradually heated while allowing the water of reaction to distill out, mostly between 150° and 160° C., until 170°–175° C. was reached, and held at this temperature for 5 hours. At this point, 64 parts calcium hydroxide was added in small portions, allowing the foaming accompanying reaction of each portion added to subside before adding the next portion. After addition of the calcium hydroxide the mixture was heated for one hour at 175° C., discharged into a mold, and allowed to cool under nitrogen protection. Grinding produced an off-white powder, codispersion of N,N'-ethylene-bis-(stearamide) and calcium stearate, with the following properties:

Melting point: 130°–140° C.
Acid number: 8.
Amine number: nil.

EXAMPLE II

A reaction vessel was charged with 877 parts of high purity stearic acid (containing about 90% n-octadecanoic acid, with the remainder almost all hexadecanoic acid). The acid was melted by heating under nitrogen protection. Ethylene diamine 27 parts was added, starting when the acid melt was at 90° C., and the temperature was controlled not to exceed 110° C. during the addition. After the addition, the reaction mixture was heated to 150° C., and held for two hours while allowing the reaction water to escape.

In a second vessel, 213 parts of barium hydroxide monohydrate was dissolved in 8000 parts of hot water at 65° C., and the hot mixture from the first vessel then poured in a thin stream into the second vessel, with stirring. The resulting slurry was stirred and heated for 1 hour at 90° C., and filtered to recover the product. Drying under vacuum at 60° C. gave a white powder, codispersion of N,N'-ethylene-bis-(stearamide) and barium stearate.

EXAMPLE III

All operations beginning with the charge of stearic acid to the reaction vessel were carried out under nitrogen protection. The vessel was charged with 694.1 parts of high purity stearic acid and heated to melt the acid. Stirring was begun when the acid melted. Ethylenediamine 37.9 parts was added with the temperature held between 100° and 110° C. The vessel was connected to a water trap, gradually heated to 170° C., and then held at 170° C. while distilling reaction water into the trap. Heating was continued for one hour after water stopped coming over. The water trap was disconnected, and 74.1 parts calcium hydroxide sprinkled into the hot reaction mixture (170°–175° C.). Heating was continued with the water trap again connected, but showed no visual accumulation of water. Heating was stopped and 274.7 parts dimethyltin bis(isooctyl thioglycolate) added and mixed into the melt for about 15 minutes. The mixture was removed to an aluminum-lined receiver, allowed to cool and solidify under nitrogen protection, and then powdered. The product was codispersed calcium stearate, ethylene-bis-stearamide and dimethyltin-bis-(isooctyl thioglycolate).

EXAMPLE IV

A preparation was carried out with mixed fatty acid (containing 45% hexadecanoic acid and the remainder predominantly octadecanoic acid, with small amounts of other fatty acids) 736.3 parts, and 42.1 parts of ethylenediamine, reacting these at 175° C. for 1 hour to an acid number of 100 (mg KOH per gram of sample). Calcium hydroxide 50.6 parts was added in small portions, and reacted at 175° C. to an acid number of 9.3. Dimethyltin bis(isooctyl thioglycolate) 291.8 parts was blended into the melt, which was then discharged to a receiver and kept protected with nitrogen while cooling to ambient temperature. The product was a codispersion of calcium mixed fatty acid soap and ethylene bis-(mixed fatty acid amide), with dimethyl tin bis(isooctyl thioglycolate).

EXAMPLE V

A preparation was carried out as in Example IV with the high purity stearic acid and a higher proportion of alkyltin mercaptoester stabilizer blended into the amide soap codispersion, and the conditions otherwise as described in Example IV. Quantities of ingredients used were as follows:

High purity grade stearic acid: 5454 parts
Ethylenediamine: 295 parts
Calcium hydroxide: 355 parts
Dimethyltin bis (IOTG): 2878 parts The product was codispersed ethylene bis stearamide, calcium stearate and dimethyl tin bis(isooctyl thioglycolate).

EXAMPLE VI

A preparation was carried out as in Example IV with paraffin wax, another polyvinyl chloride additive that can be included in the preparation of a metal soap-bisamide codispersion, with the following ingredients added to the vessel and reacted in the order shown:

Paraffin wax (m. 160° F.): 182 parts
Commercial stearic acid: 515 parts
Ethylenediamine: 19.2 parts
Calcium hydroxide: 46.3 parts
Dimethyltinbis(isooctyl thioglycolate): 273 parts The product was codispersed ethylene bis-stearamide, calcium stearate, dimethyl tin bis(isooctyl thioglycolate) and paraffin wax.

EXAMPLE VII

A reaction vessel was charged with 440 parts by weight commercial stearic acid (acid value 204.9, containing about 70% n-octadecanoic acid, with the remainder mostly hexadecanoic acid and small amounts of other fatty acids). The vessel was blanketed with nitrogen, and heat applied to melt the stearic acid. Agitation was started when most of the acid was melted. When the acid reached 95° C., addition of 26.3 parts ethylene diamine was started through a tube extending below the surface of the acid to avoid volatilization of the amine. The addition of the amine was exothermic, and was regulated to keep the mixture at about 95° C. After the ethylenediamine had been added, the mixture was gradually heated while allowing the water of reaction to distill out, mostly between 150° and 160° C., until 170°–175° C. was reached, and held at this temperature for 5 hours. At this point the acid number of a sample was 91, and 69.3 parts barium hydroxide monohydrate was added in small portions, allowing the foaming accompanying reaction of each portion added to subside before adding the next portion. After addition of the barium hydroxide the mixture was heated for one hour at 175° C., discharged into a mold, and allowed to cool under nitrogen protection. Grinding produced an off-white powder, codispersion of N,N'-ethylene-bis-(stearamide) and barium stearate, with the following properties:

Melting point: 138°–142° C.
Acid number: 7.7.

EXAMPLE VIII

A reaction vessel was charged with 463 parts by weight commercial stearic acid (acid value 204.9, containing about 70% n-octadecanoic acid, with the remainder mostly hexadecanoic acid and small amounts of other fatty acids). The vessel was blanketed with nitrogen, and heat applied to melt the stearic acid. Agitation was started when most of the acid was melted. When the acid reached 95° C., addition of 26.3 parts ethylene diamine was started through a tube extending below the surface of the acid to avoid volatilization of the amine. The addition of the amine was exothermic, and was regulated to keep the mixture at about 95° C. after a brief excursion to 134° C. After the ethylenediamine had been added, the mixture was gradually heated while allowing the water of reaction to distill out, mostly between 150° and 160° C., until 170°–175° C. was reached, and held at this temperature for 4 hours. At this point, the acid number of a sample was 96.7, and 33.3 parts of zinc oxide was added in small portions. After addition of the zinc oxide the milky mixture was heated for two hours at 175° C., discharged into a mold, and allowed to cool under nitrogen protection. Grinding produced a light tan powder, codispersion of N,N'-ethylene-bis-(stearamide) and zinc stearate, with the following properties:

Melting point: 136°–141° C.

Acid number: 91.5, representing the titration of zinc stearate as well as any remaining free stearic acid.

EXAMPLE IX

A reaction vessel was charged with 421 parts by weight commercial stearic acid (acid value 204.9, containing about 70% n-octadecanoic acid, with the remainder mostly hexadecanoic acid and small amounts of other fatty acids). The vessel was blanketed with nitrogen, and heat applied to melt the stearic acid. Agitation was started when most of the acid was melted. When the acid reached 95° C., addition of 26.3 parts ethylene diamine was started through a tube extending below the surface of the acid to avoid volatilization of the amine. The addition of the amine was exothermic, and was regulated to keep the mixture in the range 95°–105° C. After ethylenediamine had been added, the mixture was gradually heated while allowing the water of reaction to distill out, mostly between 150° and 160° C., until 170°–175° C. was reached, and held at this temperature for 3 hours 45 minutes. At this point, the acid number of a sample was 87, and 74 parts lead oxide was added in small portions, allowing the reaction of each portion added to subside before adding the next portion. After addition of the lead oxide the mixture was heated for four hours at 175° C., discharged into a mold, and allowed to cool under nitrogen protection. Grinding produced a tan powder, codispersion of N,N'-ethylene-bis-(stearamide) and lead stearate, with the following properties:

Melting point: 135°–141° C.

Acid number: 58.6, representing the titration of lead stearate as well as any remaining free stearic acid.

EXAMPLE X

A reaction vessel was charged with 420 parts by weight commercial stearic acid (acid value 204.9, containing about 70% n-octadecanoic acid, with the remainder mostly hexadecanoic acid and small amounts of other fatty acids). The vessel was blanketed with nitrogen, and heat applied to melt the stearic acid. Agitation was started when most of the acid was melted. When the acid reached 90° C., addition of 13.2 parts ethylene diamine was started through a tube extending below the surface of the acid to avoid volatilization of the amine. The addition of the amine was exothermic, and was regulated to keep the mixture in the range 90°–105° C. After the ethylenediamine had been added, the mixture was gradually heated while allowing the water of reaction to distill out, mostly between 150° and 160° C., until 170°–175° C. was reached, and held at this temperature for 3 hours. At this point the acid number of a sample was 146.5, and 103.9 parts barium hydroxide monohydrate was added in small portions, allowing the foaming accompanying reaction of each portion to subside before adding the next portion. After addition of the barium hydroxide the mixture was heated for one hour at 175° C., discharged into a mold, and allowed to cool under nitrogen protection. Grinding produced an off-white powder, codispersion of N,N'-ethylene-bis-(stearamide) and barium stearate, with the following properties:

Melting point: 148° C.

Acid number: 8.8.

The following Examples represent preferred embodiments of polyvinyl chloride resin compositions including codispersions of the invention prepared as described above.

EXAMPLE 1

Two polyvinyl chloride resin compositions suitable for extrusion of siding and window frames were prepared, having the following formulation:

|  | Parts by Weight | |
|---|---|---|
|  | Example 1 | Control |
| Medium M.W. Vinyl chloride homopolymer (Vygen 107) | 100 | 100 |
| Methacrylate-butadiene-styrene terpolymer (Durastrength 200) | 8 | 8 |
| Acrylic processing aid (K120N) | 8 | 8 |
| Acrylic processing aid (K-175) | 1 | 1 |
| Calcium carbonate (surface-coated with stearic acid) | 5 | 5 |
| Dimethyltinbis (isooctyl thioglycolate) | 1.5 | 1.5 |
| Calcium stearate | — | 2 |
| Ethylene bis(stearamide) | — | 2 |
| Codispersion of Example I | 4 | — |

The compositions were milled on a two-roll mill at 375° F. for three minutes, and then sheeted off. The milled sheets were cut into strips, which were then placed in an oven and heated at 375° F. (190° C.) for 120 minutes, with samples of each cut off from the strips at 10 minute intervals, and placed on a card. The colors of the samples thus taken were noted, and are reported below in Table I:

TABLE I

| Time (minutes) | Example 1 | Control |
|---|---|---|
| Initial | White | White |
| 10 | White | Pale yellow tint |
| 20 | Barely perceptible yellow tint | Pale yellow |
| 30 | Pale yellow tint | Light yellow |
| 40 | Pale yellow | Yellow |
| 50 | Light yellow | Dark yellow |
| 60 | Yellow | Dark yellow with brown edges |
| 70 | Dark yellow | Brown |
| 80 | Dark yellow with brown edges | Dark brown |
| 90 | Brown | Black |
| 100 | Dark brown | Black |
| 110 | Dark brown | Black |
| 120 | Dark brown | Black |

The improved stability imparted by Example 1, the codispersion of the invention, is apparent from the above results. The Control noticeably yellowed in ten minutes, while twenty minutes was required for the first perceptible yellow tint to appear in Example 1. The Control discolored to dark yellow after 50 minutes, while 70 minutes were required for Example 1 to reach the same color.

EXAMPLE 2

Two polyvinyl chloride resin compositions suitable for extrusion of siding and window frames were prepared, having the following formulation:

|  | Parts by Weight | |
|---|---|---|
|  | Example 2 | Control |
| Medium M.W. Vinyl chloride homopolymer (Geon 30) | 100 | 100 |
| Methacrylate-butadiene-styrene terpolymer (Acryloid KM-611) | 10 | 10 |

|  | Parts by Weight | |
|---|---|---|
|  | Example 2 | Control |
| Acrylic processing aid (K120N) | 3 | 3 |
| Titanium dioxide | 2 | 2 |
| Dibutyltinbis (isooctyl thioglycolate) | 2 | 2 |
| Calcium stearate | — | 1 |
| Ethylene bis(stearamide) | — | 1 |
| Codispersion of Example I | 2 | — |

The compositions were milled on a two-roll mill at 375° F. for three minutes, and then sheeted off. The milled sheets were cut into strips, which were then placed in an oven and heated at 375° F. (190° C.) for 120 minutes, with samples of each cut off from the strips at 15 minute intervals, and placed on a card. The colors of the samples thus taken were noted, and are reported below in Table II.

TABLE II

| Time (minutes) | Example 2 | Control |
|---|---|---|
| Initial | White | White |
| 15 | White | Off white |
| 30 | Barely perceptible yellow tint | Pale yellow |
| 45 | Pale yellow | Light yellow |
| 60 | Pale yellow | Yellow |
| 75 | Light yellow | Dark yellow with brown edges |
| 90 | Yellow | Dark yellow with brown edges |
| 105 | Yellow with brown edges | Brown |
| 120 | Dark yellow with brown edges | Dark brown |

The improved stability imparted by Example 2, the codispersion of the invention, is apparent from the above results. The Control noticeably changed in fifteen minutes, while thirty minutes was required for the first perceptible yellow tint to appear in Example 2.

EXAMPLE 3

Two polyvinyl chloride resin compositions suitable for extrusion of siding and window frames were prepared, having the following formulation:

|  | Parts by Weight | |
|---|---|---|
|  | Example 3 | Control |
| Medium M.W. Vinyl chloride homopolymer (Geon 30) | 100 | 100 |
| Methacrylate-butadiene-styrene terpolymer (Acryloid Km-611) | 10 | 10 |
| Acrylic processing aid (K120N) | 3 | 3 |
| Titanium dioxide | 2 | 2 |
| Dibutyltinbis (isooctyl thioglycolate) | 2 | 2 |
| Calcium stearate | — | 1 |
| Ethylene bis(stearamide) | — | 1 |
| Codispersion of Example X | 2 | — |

The compositions were milled on a two-roll mill at 375° F. for three minutes, and then sheeted off. The milled sheets were cut into strips, which were then placed in an oven and heated at 375° F. (190° C.) for 120 minutes, with samples of each cut off from the strips at 15 minute intervals, and placed on a card. The colors of the samples thus taken were noted, and are reported below in Table III.

TABLE III

| Time (minutes) | Example 3 | Control |
|---|---|---|
| Initial | White | White |
| 15 | White | Off white |
| 30 | White | Pale yellow |
| 45 | Barely perceptible yellow tint | Light yellow |
| 60 | Pale yellow | Yellow |
| 75 | Pale yellow | Dark yellow with brown edges |
| 90 | Light yellow | Dark yellow with brown edges |
| 105 | Yellow | Brown |
| 120 | Yellow with brown edges | Dark brown |

The improved stability imparted by Example 3, the codispersion of the invention, is apparent from the above results. The Control noticeably changed in fifteen minutes, while forty-five minutes was required for the first perceptible yellow tint to appear in Example 3.

Having regard to the foregoing disclosure the following is claimed as the inventive and patentable embodiments thereof:

1. Codispersed particulate lubricant stabilizer compositions for synthetic resins, the particles consisting essentially of the product prepared by blending from about 4 parts to about 1 part polyvalent metal fatty acid soap with from about 1 part to about 4 parts alkylene-bis-(fatty acid amide), and heating until water of reaction is no longer released.

2. Codispersed particulate lubricant stabilizer compositions according to claim 1, in which the amount of polyvalent metal fatty acid soap is within the range from about 3 parts to about 1 part for each part of alkylene-bis(fatty acid amide).

3. Codispersed particulate lubricant stabilizer compositions according to claim 1 in which the polyvalent metal fatty acid soap is of a fatty acid having from about ten to about twenty-four carbon atoms, and the polyvalent metal is selected from the group consisting of magnesium, calcium, strontium, barium, zinc, lead and cadmium.

4. Codispersed particulate lubricant stabilizer compositions according to claim 1 in which the alkylene bis(fatty acid amide) has the formula:

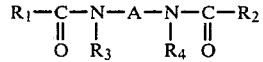

wherein:

R₁ and R₂ are long chain fatty acid groups having from about nine to about twenty-three carbon atoms;

R₃ and R₄ are hydrogen or lower alkyl having from one to about six carbon atoms; and A is an alkylene group having from two to about six carbon atoms.

5. Codispersed particulate lubricant stabilizer compositions according to claim 4 in which the alkylene bis fatty acid amid is an ethylene bis(fatty acid amide).

6. Codispersed particulate lubricant stabilizer compositions according to claim 1 in which the polyvalent metal fatty acid soap is a polyvalent metal stearate, and the alkylene bis fatty acid amide is ethylene bis(stearamide).

7. Codispersed particulate lubricant stabilizer compositions according to claim 1 including codispersed therewith a polyvinyl chloride resin stabilizer.

8. Codispersed particulate lubricant stabilizer compositions according to claim 7 in which the polyvinyl chloride resin stabilizer is selected from the group consisting of organotin compounds, organic phosphites, phenolic antioxidants, and polyvalent metal phenolates.

9. Codispersed particulate lubricant stabilizer compositions according to claim 1 including codispersed therewith a hydrocarbon wax lubricant.

10. Codispersed particulate lubricant stabilizer compositions according to claim 9 in which the hydrocarbon wax is paraffin wax.

11. Polyvinyl chloride resin compositions comprising a polyvinyl chloride resin and a codispersed particulate lubricant stabilizer composition according to claim 1.

12. Polyvinyl chloride resin compositions according to claim 11 in which the polyvinyl chloride resin is polyvinyl chloride resin homopolymer.

13. Polyvinyl chloride resin compositions comprising a polyvinyl chloride resin and a codispersed particulate lubricant stabilizer composition according to claim 7.

14. Polyvinyl chloride resin compositions according to claim 11 in which the polyvinyl chloride resin stabilizer is selected from the group consisting of organotin compounds, organic phosphites, phenolic antioxidants, and polyvalent metal phenolates.

15. Polyvinyl chloride resin compositions comprising a polyvinyl chloride resin and a codispersed particulate lubricant stabilizer composition according to claim 9.

16. Polyvinyl chloride resin compositions according to claim 15 in which the hydrocarbon wax is paraffin wax.

* * * * *